INVENTORS
EVANS T. MORTON
TONY R. FITZGERALD
BY
SETTLE & OLTMAN
ATTORNEYS

Dec. 7, 1971  E. T. MORTON ET AL  3,624,977
RECESSED CONDUIT CONSTRUCTION
Filed Jan. 9, 1970  3 Sheets-Sheet 2
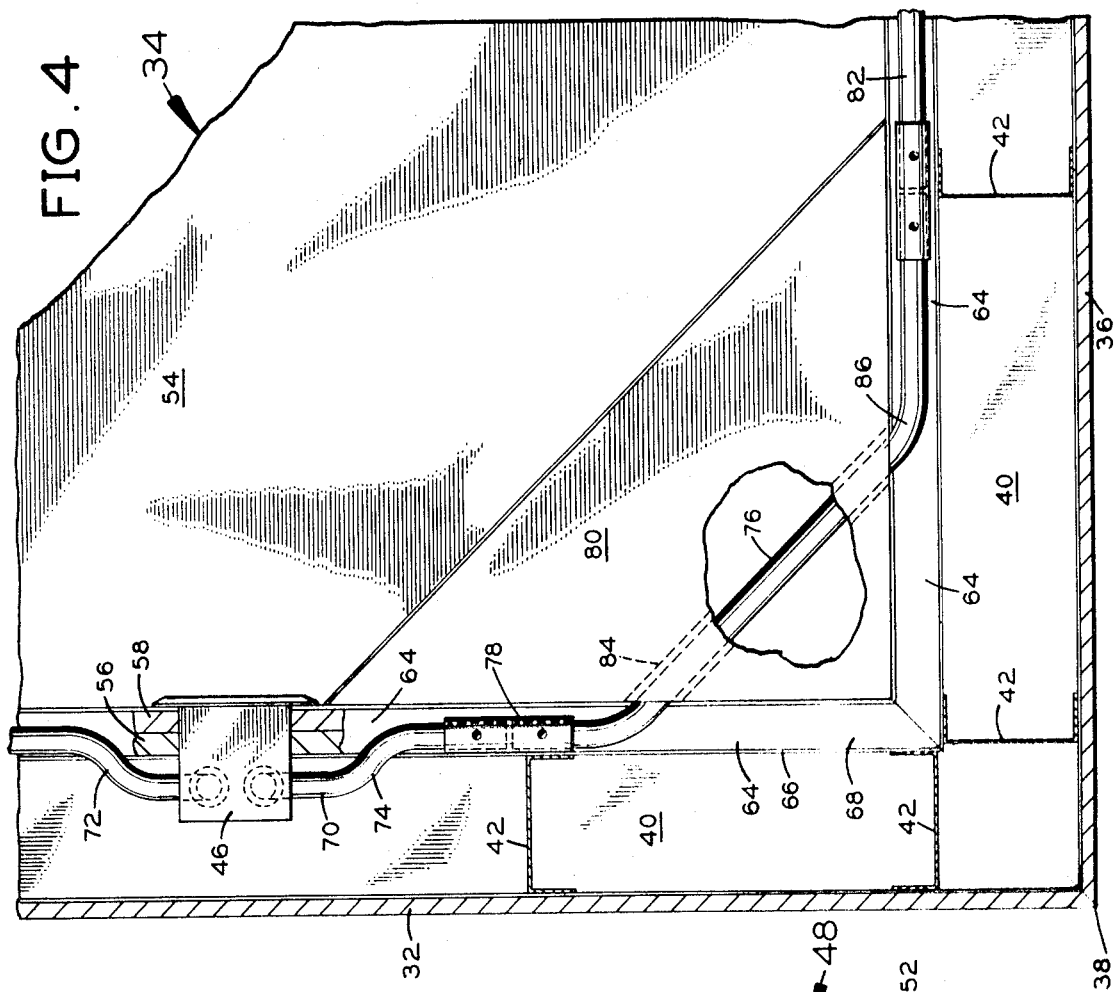
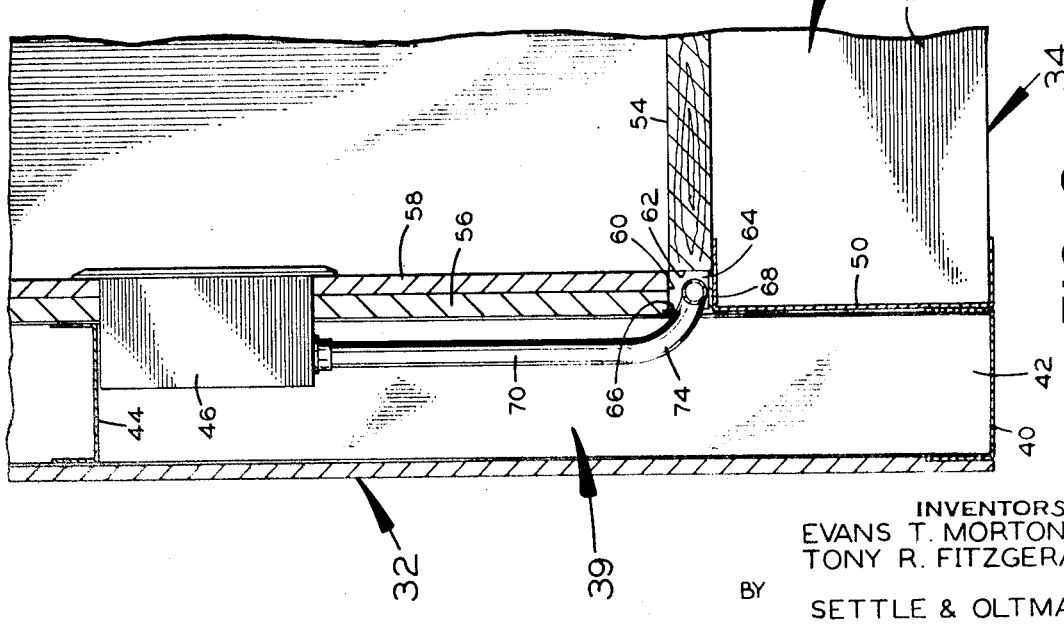
INVENTORS
EVANS T. MORTON
TONY R. FITZGERALD
BY
SETTLE & OLTMAN
ATTORNEYS Dec. 7, 1971  E. T. MORTON ET AL  3,624,977
RECESSED CONDUIT CONSTRUCTION
Filed Jan. 9, 1970  3 Sheets-Sheet 3

INVENTORS
EVANS T. MORTON
TONY R. FITZGERALD
BY
SETTLE & OLTMAN
ATTORNEYS

United States Patent Office 3,624,977
Patented Dec. 7, 1971

3,624,977
RECESSED CONDUIT CONSTRUCTION
Evans T. Morton, Pompano Beach, and Tony R. Fitzgerald, Fort Lauderdale, Fla., assignors to Behring Corporation, Fort Lauderdale, Fla.
Filed Jan. 9, 1970, Ser. No. 1,769
Int. Cl. E04b 1/348, 5/48
U.S. Cl. 52—221          8 Claims

ABSTRACT OF THE DISCLOSURE

A recessed conduit construction for buildings, particularly modular homes and the like, wherein a wall and floor define a horizontally extending recess, and conduit means extends from outlets in or adjacent to the wall and enters into the recess at floor level and extends horizontally in the recess adjacent the frame structure but not interfering therewith. Preferably, the conduit means crosses corners between walls through a recess in the underside of the flooring.

BACKGROUND OF THE INVENTION

In the construction of certain modular homes, the walls and floor are built as subassemblies and then assembled together into a module. The walls and floor each include a frame. Wall panels are applied to the inside face of each wall frame, and flooring, which may be a plywood panel, is applied to the upper face of the floor frame.

A problem is encountered in building in the electrical system. The electrical system ordinarily includes conduits in which the wiring runs to outlets and switches of the system. The term conduit as used herein is intended to include various forms of electrical hardware whether it be of the flexible cable type, the rigid tube type, or other type, and is not limited to rigid metal tubes which are sometimes particularly called conduit in the trade. If the electrical conduits are built into the wall frames, it would ordinarily become necessary to provide apertures in vertical studs of the frames and perhaps in other structural members so that the conduit could be run through the apertures in the studs in order to run the conduit from one outlet or switch to another, by way of example. Building the conduit into the wall frames in this manner becomes a rather laborious process requiring considerable time and effort, all of which slows down production, requires extra labor, and increases production costs.

SUMMARY OF THE INVENTION

The present invention provides a recessed conduit construction in which the wall and floor define a horizontally extending recess at the corner where the wall and floor meet, and the conduit is provided in this recess. The conduit may extend from electrical outlets mounted in the wall structure or at a baseboard and enter into the horizontal recess at floor level. By recessing the conduit in this manner. it is possible to apply the conduit to the wall frame before the wall frame is assembled with the floor frame, and the conduit in the assembled module lies in the recess between wall and floor without interfering in any way with the wall frame structures.

The conduit sometimes has to extend across a corner between walls, and where this is necessary, the conduit may run through a recess which extends upwardly from the underside of the flooring and communicates with wall-floor recesses on opposite sides of the corner. With this construction, the conduit need not be bent at a 90° angle or close to a 90° angle in order to go around a corner of a room. Such bends may weaken the conduit and are sometimes prohibited by building codes.

Accordingly, it is an object of the present invention to provide a recessed conduit construction which allows electrical conduit to be built into buildings, particularly modules for homes, without interfering with or extending through structural members of wall or floor frames.

Another object of the invention is to simplify the installation of electrical conduit in factory built modules or other buildings.

Another object of the invention is to provide a recessed conduit construction which allows conduit to be applied to subassemblies of modules before the subassemblies are put together to form the module.

A further object of the invention is to provide a recessed conduit construction which allows conduit to cross a corner of a room while remaining recessed and hidden without requiring a sharp bend in the conduit.

Other objects of this invention will appear from the following description and appended claims, reference being had to the accompanying drawings forming a part of this specification wherein like reference characters designate corresponding parts in the several views.

On the drawings:

FIG. 3 is a fragmentary sectional view taken along line 3—3 of FIG. 1 showing an area where a wall and a floor meet to illustrate how the electrical conduit is recessed;

FIG. 4 is a horizontal sectional view taken along line 4—4 of FIG. 2 further illustrating the recessed conduit construction;

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
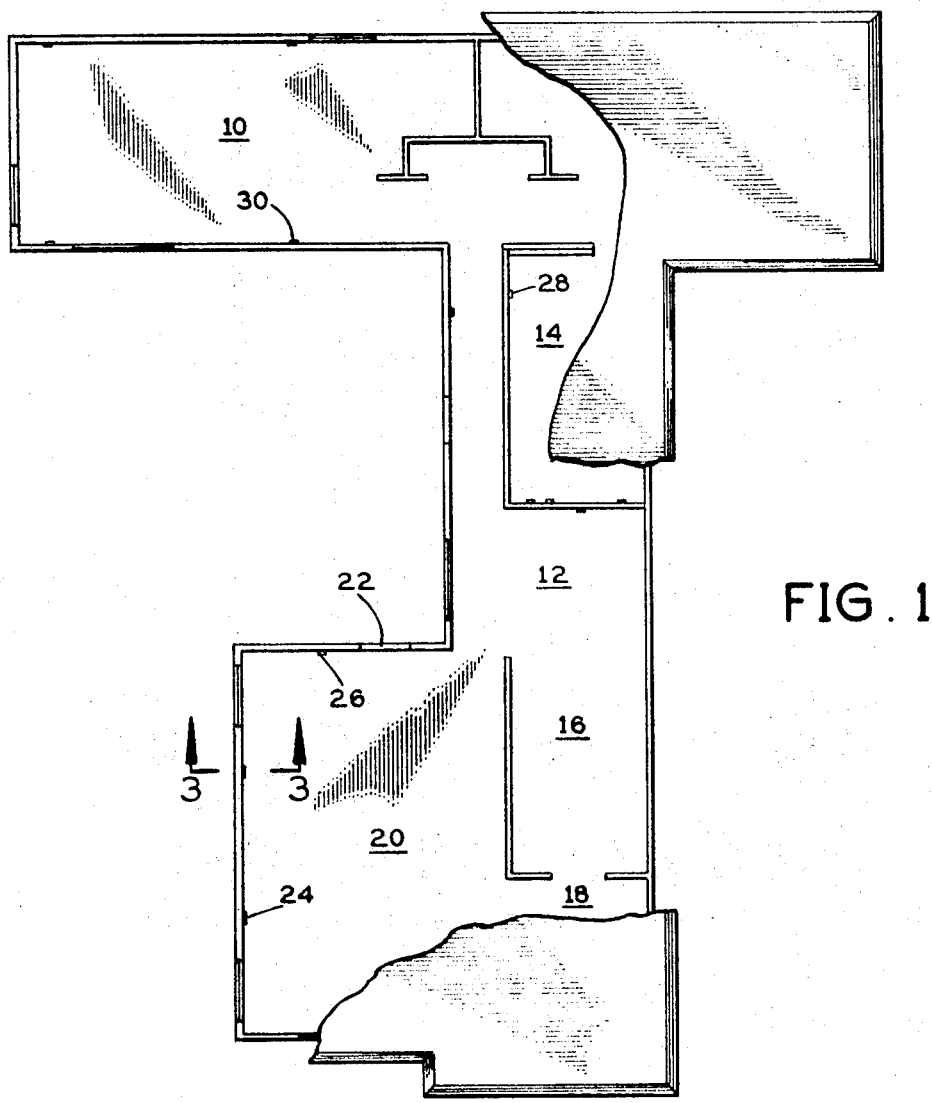
FIG. 1 is a plan view, partially broken away, showing the layout of a modular home which may be provided with recessed conduit in accordance with the invention.
Figure 2:
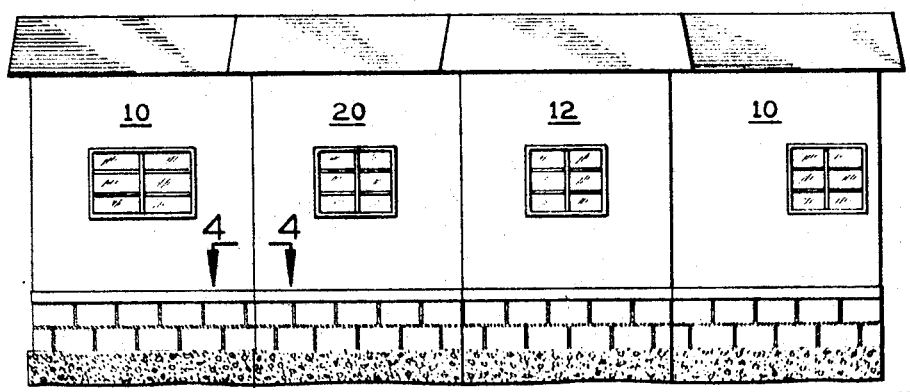
FIG. 2 is an elevational view of one end of the modular home of FIG. 1.

As shown on the drawings:

In the modular home of FIG. 1, there are three modules joined together so as to form a complete home. The module 10 at the top of the figure is a bedroom module, and it contains two bedrooms as shown. The module 12 which extends vertically in FIG. 1 and intersects the bedroom module 10 is known as a "wet" module since all of the plumbing for the home is provided in this module. This module contains bathroom space in the area 14, kitchen space in the area 16 and dining space in the area 18. At the lower left side of FIG. 1, is a third module 20 which contains the living room space and which has a front door at 22. FIG. 2 is an elevational view illustrating somewhat incompletely the appearance of the home when viewing from the bottom and looking up in FIG. 1.

The electrical system for the home must supply electrical service to all of the modules from a central circuit panel which is ordinarily provided in the wet module. This requires that conduit containing wiring run from the central circuit panel or service point throughout the building so as to carry wiring to the various wall outlets, wall switches, and the like which are distributed at desirable positions throughout the home. For example, in FIG. 1, outlets are shown at 24, 26, 28 and 30 at various points in the home, and these are only some of the outlets which are provided. It is apparent that the electrical conduit must reach all of these outlets as well as switches and other fixtures which may be needed.

In building a module for a home of the type shown in FIGS. 1 and 2, it is desirable to construct the walls, floors and roof as subassemblies, and then assemble these subassemblies into a complete module. If, for example, it is necessary to run the electrical conduit through the wall subassembly within the framing thereof, the conduit must pass through various structural members. These structural members must therefore be apertured in order to allow the conduit to be strung through them. As pointed out previously, this involves considerable labor and cost, and is to be avoided if at all possible.

FIGS. 3 and 4 illustrate how the recessed conduit construction of the invention avoids construction problems and yet allows a safe recessed conduit construction wherein the conduit is hidden from view, protected and electrically grounded so as to avoid hazards.

In FIG. 3, there is shown a section of a wall 32 and a section of a floor 34 adjoinng the wall. In FIG. 4, the wall 32 and the floor 34 appear in a horizontal sectional view which also shows another wall 36 meeting wall 32 at a corner 38.

The wall 32 includes a wall frame structure which has a base in the form of a metal channel 40 and upright metal stud 42 bottomed in the base channel 40. Several of these studs 42 are shown in section in FIG. 4 as well as the base channels 40 for two walls 32 and 36. A horizontal brace 44 is shown in section in FIG. 3. An electrical outlet box 46 of conventional form is shown as being attached as by welding to the base 44. The wall frame structure is of a welded construction for maximum rigidity.

A floor frame structure 48 includes a metal channel 50 meeting the wall 32 and another metal channel such as channel 52 extending perpendicular to channel 50. These latter channels are welded together to provide a rigid floor frame. Mounted on the upper surface of the floor frame 48 is flooring 54 which may be in the form of a plywood panel or panels coextensive with the floor area. Mounted on the wall frame 39 on the inside face thereof are wall panels 56 and 58 which by way of example may be gypsum board.

The wall panels 56 and 58 have a lower edge 60, and the floor panel 54 has a side edge 62. It may be seen that the edges 60 and 62 meet each other at a corner and terminate abruptly at that corner to define a recess 64 which lies directly in front of the wall frame 39 and directly above the floor frame 48. Mounted on the wall frame 39 as by welding to the studs 42 is a metal angle member 66 which has a vertical side affixed to the stud 42 and a horizontal side 68 forming a shelf at the bottom of the recess 64. This angle member 66 may be attached to the wall frame 39 prior to assembly of the wall frame 39 with the floor frame 48.

Electrical conduits 70 and 72 extend downwardly from the outlet box 46 within the frame 39 inbetween vertical studs and go through a bend at 74 to enter the recess 64 at floor level as shown in FIG. 3. There is a gap between different sections of angle member 66 through which the conduit enters recess 64. The conduit 70 then extends horizontally within recess 64 through a predetermined length of the recess in the manner shown in FIG. 4. Conduit 72 likewise extends horizontally in recess 64 on the other side of the outlet 46. The conduits 70 and 72 are welded to the shelf 68, and since the shelf 68 is part of member 66 which is welded to the metal wall frame 39, the electrical conduit is electrically grounded to the metal frame of the module.

Another piece of conduit 76 is connected to conduit piece 70 by a coupling 78, and it may be seen in FIG. 4 that the conduit piece 76 crosses the corner of the module. A triangular piece 80 of the floor panel 54 is cut from the remainder of the floor panel and is provided with an upwardly extending recess on the bottom side thereof. The conduit 76 crosses the corner of the room within this upwardly extending recess beneath the outer surface of the floor.

The upwardly extending recess 84 and the corner piece 80 of the floor panel is shown in dashed lines in FIG. 4, and it may be seen that the recess 84 communicates with both sections of recess 64 on opposite sides of the corner 38. The conduit piece 76 connects with another conduit piece 82 on the other side of the corner and runs to another electrical outlet or to a switch or the like. It may be seen that the conduit pieces 70, 72, 76 and 82 are all hidden from view as far as a person within the inside of the building is concerned, and they are protected within the recess 64 by the flooring 54 and the wall panels 56 and 58. Carpet may be laid on the floor paneling 54, and the carpet may be curled upwardly over the corner at edges 60, 62 to cover any very slight gaps where the edges 60, 62 meet. The conduit is located at the floor level, so only relatively short stretches of conduit are needed to run up to the outlet boxes 46. The horizontal stretches of conduit within the recess 64 are above the floor frame 48 and in front of the wall frame 39, so the conduit in no way interferes with the framing structure. It is obviously not necessary to form any holes in studs or other structure of the framing for the purpose of stringing conduit through the holes.

It may be seen that the conduit piece 76 which crosses the corner of the room has bends at 84 and 86, and these bends are relatively gradual; much less sharp than a 90° bend. By having the conduit cross corners in this manner, it is not necessary to provide a sharp 90° bend right at the corner. A 90° bend in the conduit could be hazardous, and also may not comply with some building codes.

Figure 5:
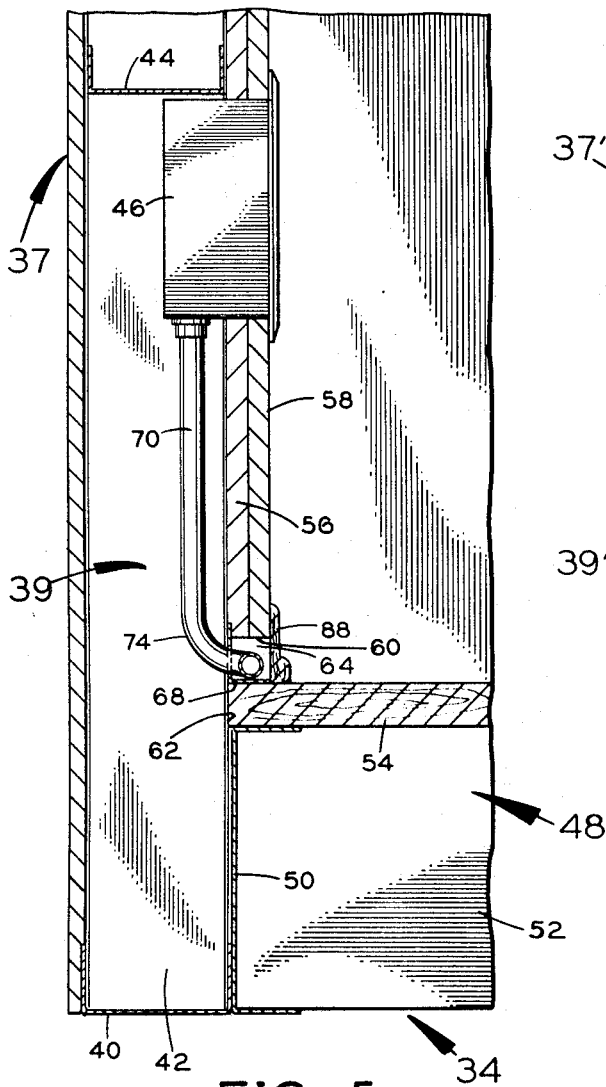
FIG. 5 is a vertical sectional view similar to FIG. 3, but showing a modified construction.

A slightly modified construction is shown in FIG. 5, but since the modification is slight, the same reference numerals have been used for like parts. It may be seen that the lower edges 60 of wall panels 56 and 58 terminate at a point spaced above the floor panel 54, and in this case the floor panel extends completely over to the wall frame. A baseboard 88 is used to cover the front of the recess 64. The conduit 70 enters this recess 64 in exactly the same manner as described previously.

Figure 6:
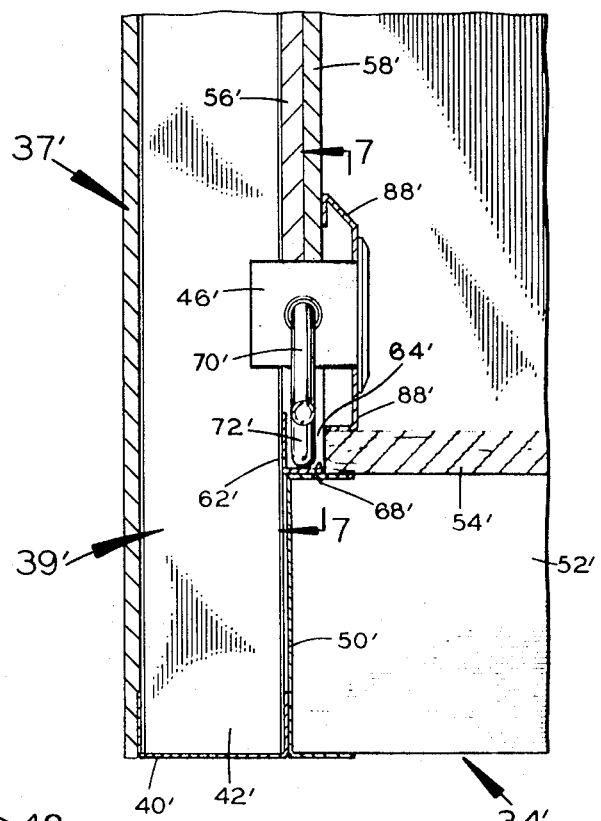
FIG. 6 is another vertical sectional view illustrating another embodiment.
Figure 7:
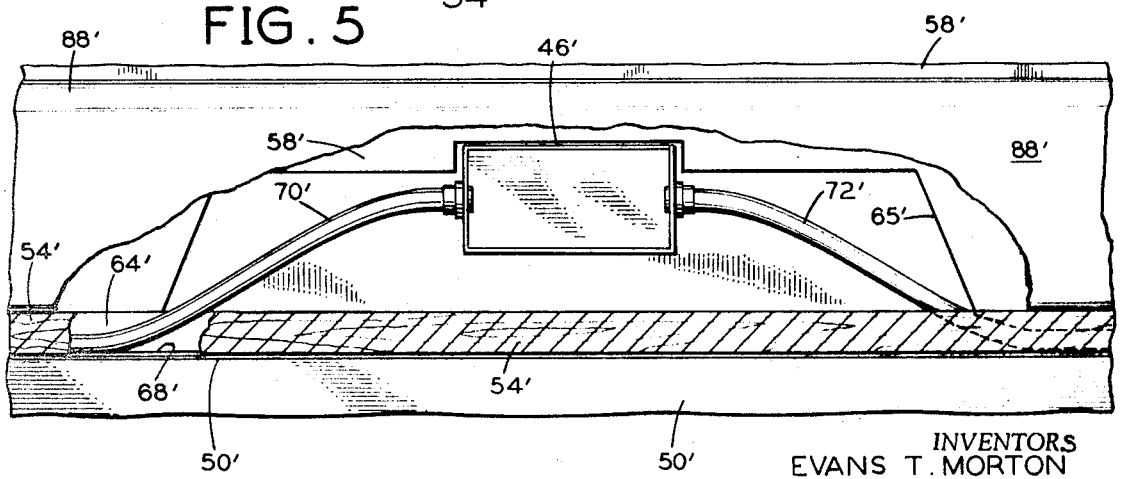
FIG. 7 is a horizontal sectional view of the embodiment of FIG. 6.

In the embodiment of FIGS. 6 and 7, the same reference numerals are used with the addition of prime marks. In this embodiment, the recess 64' is formed between the wall paneling and the floor paneling in exactly the same manner as in FIG. 3. The difference is that a notch 65' is cut in the bottom edge of the wall paneling to receive the outlet 46', and a baseboard 88' is used to cover the front side of the outlet and notch.

As previously mentioned, the term conduit is used in a relatively broad sense herein to apply to cable, whether metal, plastic or the like, as well as rigid tubes of the type shown in the drawings. Other forms of conduit may also be suitable.

Having thus described our invention, we claim:

1. In a modular building having an electrical system in which wiring is provided in conduit means extending through the building, the combination of floor frame means, wall frame means adjoining said floor frame means, flooring on said floor frame means, wall board on said wall frame means facing said flooring, said wall board having a lower horizontal edge and said flooring having a vertical side edge which meet each other at a right angle corner to define a recess adjacent said wall frame means and above said floor frame means which recess is hidden without the use of baseboard, electrical outlet means supported in said wall frame means above said flooring, and conduit means connected to and extending downwardly from said outlet means and bending into said recess and extending horizontally in said recess next to said wall frame means, thus staying clear of said wall frame means and said floor frame means where extending horizontally.

2. In a modular building, the combination as claimed in claim 1 in which said wall frame means has walls meeting at a vertical corner with edge-formed recesses at the bottom of said walls having conduit means therein, and said flooring being recessed upwardly from the bottom side thereof to form a recess crossing said vertical corner and communicating with said edge-formed recess, and said conduit means traversing said corner-crossing recess without a 90° bend.

3. In a modular building, the combination as claimed in claim 1 in which said wall frame means includes a shelf on which said conduit means is supported.

4. In a modular building, the combination as claimed in claim 1 in which said flooring has carpeting thereon, said carpeting bending upward at said corner and extending upward a short distance to cover a portion of said wall board and form a border.

5. In a modular building, the recessed conduit construction comprising wall frame means having metal vertical studs extending between cap beams at ends of said studs, floor frame means having horizontal metal studs extending between cap beams which are secured to said wall frame means at a corner, continuous floor panelling on said floor frame means, continuous wall board on said wall frame means facing said floor panels, said wall board having a lower horizontal edge and said floor panelling having a vertical side edge which meet each other at a right angle corner leaving a space directly under said horizontal edge and directly inside said side edge which space is hidden without the use of baseboard, electrical outlet means including a receptacle located between a pair of said studs within said wall frame means and projecting through a cutout in said wall board to be accessible at the front of said wall board above said floor panelling, and conduit means extending downwardly from said outlet means and bending into said recess where said conduit means extends horizontally in said recess next to said wall frame means and above said floor frame means, and means electrically and mechanically connecting said conduit means to said metal studs for supporting and electrically grounding said conduit means.

6. In a modular building, the recessed conduit construction as claimed in claim 5 including carpeting on said floor panelling bending over the corner where said wall board and said floor panelling meet and extending upwardly a short distance to provide a border.

7. In a modular building as claimed in claim 6, the recessed conduit construction in which said means connecting said conduit to said studs includes a shelf on which said conduit means is supported.

8. In a modular building, the recessed conduit construction as claimed in claim 6 in which said wall frame means includes walls meeting each other at a vertical corner, said floor panelling includes a recess extending upwardly therein from the bottom side thereof and crossing said vertical corner between sections of said edge-defined space, and said conduit means traverses said upward recess to cross said corner without a 90° bend.

References Cited

UNITED STATES PATENTS

| | | | |
|---|---|---|---|
| 982,522 | 1/1911 | Mitchell | 52—220 |
| 1,798,280 | 3/1931 | Sorenson | 52—242 |
| 2,000,243 | 5/1935 | Manske | 52—220 |
| 2,043,776 | 6/1936 | Schaller | 52—221 |
| 2,544,981 | 3/1951 | Buell | 52—220 X |
| 2,950,575 | 8/1960 | Hellwig | 52—221 |

FOREIGN PATENTS

| | | | |
|---|---|---|---|
| 1,343,406 | 10/1963 | France | 52—220 |

ALFRED C. PERHAM, Primary Examiner

U.S. Cl. X.R.

52—79, 287